United States Patent
Hawkins et al.

(10) Patent No.: US 7,008,689 B2
(45) Date of Patent: Mar. 7, 2006

(54) PIN REINFORCED, CRACK RESISTANT FIBER REINFORCED COMPOSITE ARTICLE

(75) Inventors: James Thomas Hawkins, Loveland, OH (US); Gerald Alexander Pauley, Hamilton, OH (US)

(73) Assignee: General Electric Company, Schenectady, NY (US)

(*) Notice: Subject to any disclaimer, the term of this patent is extended or adjusted under 35 U.S.C. 154(b) by 66 days.

(21) Appl. No.: 09/908,101

(22) Filed: Jul. 18, 2001

(65) Prior Publication Data
US 2003/0203179 A1  Oct. 30, 2003

(51) Int. Cl.
*D04H 1/00* (2006.01)

(52) U.S. Cl. .......... 428/292.1; 428/212; 428/297.4

(58) Field of Classification Search ........... 416/223 A, 416/227 A, 229 A, 230; 428/212, 297.4, 428/549
See application file for complete search history.

(56) References Cited

U.S. PATENT DOCUMENTS

| | | | | |
|---|---|---|---|---|
| 3,834,832 A | * | 9/1974 | Mallinder et al. | 416/230 |
| 3,883,267 A | * | 5/1975 | Baudier et al. | 416/230 |
| 3,892,612 A | | 7/1975 | Carlson et al. | 156/150 |
| 4,022,547 A | * | 5/1977 | Stanley | 416/230 |
| 4,728,263 A | * | 3/1988 | Basso | 416/226 |
| 4,877,376 A | * | 10/1989 | Sikorski et al. | 416/207 |
| 5,279,892 A | * | 1/1994 | Baldwin et al. | 428/257 |
| 5,308,228 A | * | 5/1994 | Benoit et al. | 416/230 |
| 5,375,978 A | * | 12/1994 | Evans et al. | 416/230 |
| 5,378,109 A | * | 1/1995 | Lallo et al. | 416/226 |
| 5,466,506 A | * | 11/1995 | Freitas et al. | 428/105 |
| 5,589,015 A | * | 12/1996 | Fusco et al. | 156/73.1 |
| 6,106,646 A | * | 8/2000 | Fairbanks | 156/73.3 |
| 6,413,051 B1 | * | 7/2002 | Chou et al. | 416/229 A |

FOREIGN PATENT DOCUMENTS

| | | | |
|---|---|---|---|
| EP | 1023986 | * | 8/2000 |

* cited by examiner

*Primary Examiner*—Rena Dye
*Assistant Examiner*—Camie S. Thompson
(74) *Attorney, Agent, or Firm*—William Scott Andes; Lee H. Sachs

(57) ABSTRACT

A composite article, for example a blading member of a gas turbine engine, comprising a plurality of stacked layers of in-plane reinforcing fibers bonded together with a matrix resin is provided with enhanced resistance to impact cracking, material loss and/or delamination through use of a plurality of spaced apart reinforcing pins disposed into the article at an angle to the stacked layers, in one form disposed in a selected article region generally to resist strain energy generated during operation of the region. In another form, enhanced resistance is provided through the combination of a matrix resin including properties comprising a tensile strain property of at least 5% and a $K_{1c}$ toughness of at least about 850 psi·inch$^{1/2}$, and a plurality of spaced apart reinforcing pins disposed into the article at an angle to the stacked layers. A method for making such a composite article with such resin comprises stacking the layers of in-plane reinforcing fibers into a shape and then inserting the reinforcing pins shape. The shape is cured with a matrix resin about the in-plane fibers of the stacked layers and about the reinforcing pins.

21 Claims, 3 Drawing Sheets

PIN REINFORCED, CRACK RESISTANT FIBER REINFORCED COMPOSITE ARTICLE

BACKGROUND OF THE INVENTION

This invention relates to a fiber reinforced composite article and method for making such article. More particularly it relates to such an article and method, for example a composite blading member including an airfoil, having generally angled or transverse pin-type reinforcing members in a toughened and enhanced resin matrix.

Components for sections of gas turbine engines, for example a fan and/or a compressor, operating at relatively lower temperatures than sections downstream of the combustion section have been made of resin matrix composites including stacked, laminated layers. Generally such primarily non-metallic composite structures, which replaced heavier predominantly metal structures, include superimposed layers, sometimes called plies, reinforced with fibers substantially in the plane of the layer. As used herein, fibers include within it meaning filaments in a variety of configurations and lay-up directions, sometimes about a core and/or with local metal reinforcement or surface shielding. For elevated temperature applications, a variety of materials are used for such fibers, including carbon, graphite, glass, metals (forms of which sometimes are called boron fibers), etc., as is well known in the art. Typical examples of such components made primarily of non-metallic composites are reported in such U.S. Pat. No. 3,892,612—Carlson et al. (patented Jul. 1, 1975); U.S. Pat. No. 4,022,547—Stanley (patented May 10, 1977); U.S. Pat. No. 5,279,892—Baldwin et al. (patented Jan. 18, 1994); U.S. Pat. No. 5,308,228—Benoit et al. (patented May 3, 1994); and U.S. Pat. No. 5,375,978—Evans et al. (patented Dec. 27, 1994).

As has been discussed in detail in such patents as the above-identified Evans et al. patent, such non-metallic composites in an aircraft gas turbine engine are subject to damage from ingestion into the engine and impact on components of foreign objects. Such objects can be airborne or drawn into the engine inlet. These include various types and sizes of birds as well as inanimate objects such as hailstones, sand, land ice, and runway debris. Impact damage to the airfoil of blading members, including fan and compressor blades, as well as damage to strut type members in the air stream, has been observed to cause loss of material and/or delamination of the stacked layers. Such a condition in a rotating blade can cause the engine to become unbalanced resulting in potentially severe, detrimental vibration.

The above identified and other prior art have reported various arrangements and structures to avoid such material loss and/or delamination of layers. Some arrangements, for example U.S. Pat. No. 3,834,832—Mallinder et al. (patented Sep. 10, 1974) and the above-identified Benoit et al. patent, include use of seams or fastening devices disposed transversely through a reinforced resin matrix. Their purpose is to avoid delamination of laminated composite structures using, as the composite matrix, ordinary commercial resin systems having the typical relatively low toughness and tensile strain properties. It has been observed, however, that disposition of such ordinary transverse reinforcement with such ordinary resin systems in modem gas turbine engine blading members such as the airfoil of a fan blade and/or without regard to what commonly is referred to in the art as strain energy developed in different portions of a blade airfoil, can result in the above-described type of damage, including delamination and/or material loss. Such damage can reduce the operating integrity and life of a composite article.

BRIEF SUMMARY OF THE INVENTION

The present invention, in one form, provides a composite article comprising a plurality of stacked layers of reinforcing fibers, preferably disposed in general alignment substantially unidirectionally with one another in a layer. Such aligned reinforcing fibers, sometimes called in-plane fibers, generally define at least a portion of the plane of a layer. The layers are bonded together with a matrix resin. A plurality of spaced apart reinforcing pins are disposed into the article in at least one selected region, in one embodiment across a selected region at a density that generally balances or resists a particular amount of strain energy developed during operation in the selected region. In another embodiment, the article that includes the stacked layers of such arrangement of reinforcing in-plane fibers further is toughened and provided with enhanced resistance to cracking and layer delamination. That is accomplished through use of a matrix resin that includes properties comprising a tensile strain property of greater than 5% and a $K_{1c}$ toughness of at least about 850 psi·inch$^{1/2}$ in combination with a plurality of particular additional reinforcing members. Such additional reinforcing members, herein referred to for convenience as pins, are disposed into the article in at least one selected article region at an angle, for example generally transverse, to the planes of the stacked layers at a selected density, preferably substantially uniformly, within the selected region. In one form, the pin comprises a bundle of a plurality of filaments impregnated with a resin as a matrix, preferably substantially completely through the stacked layers.

In another form, the present invention provides a method for making such a composite article comprising providing the plurality of layers of aligned reinforcing fibers, in one embodiment impregnated with the above-defined matrix resin in a partially cured condition. Sometimes such a partially cured member is referred to as being in the "green state" or as a "prepreg". According to a form of the method of the present invention, the layers of fibers are stacked one upon another into a stack of layers. Then the pins are inserted appropriately into the stack of layers. Thereafter, the matrix resin is cured about the layers and the pins.

DETAILED DESCRIPTION OF THE INVENTION

Figure 1:
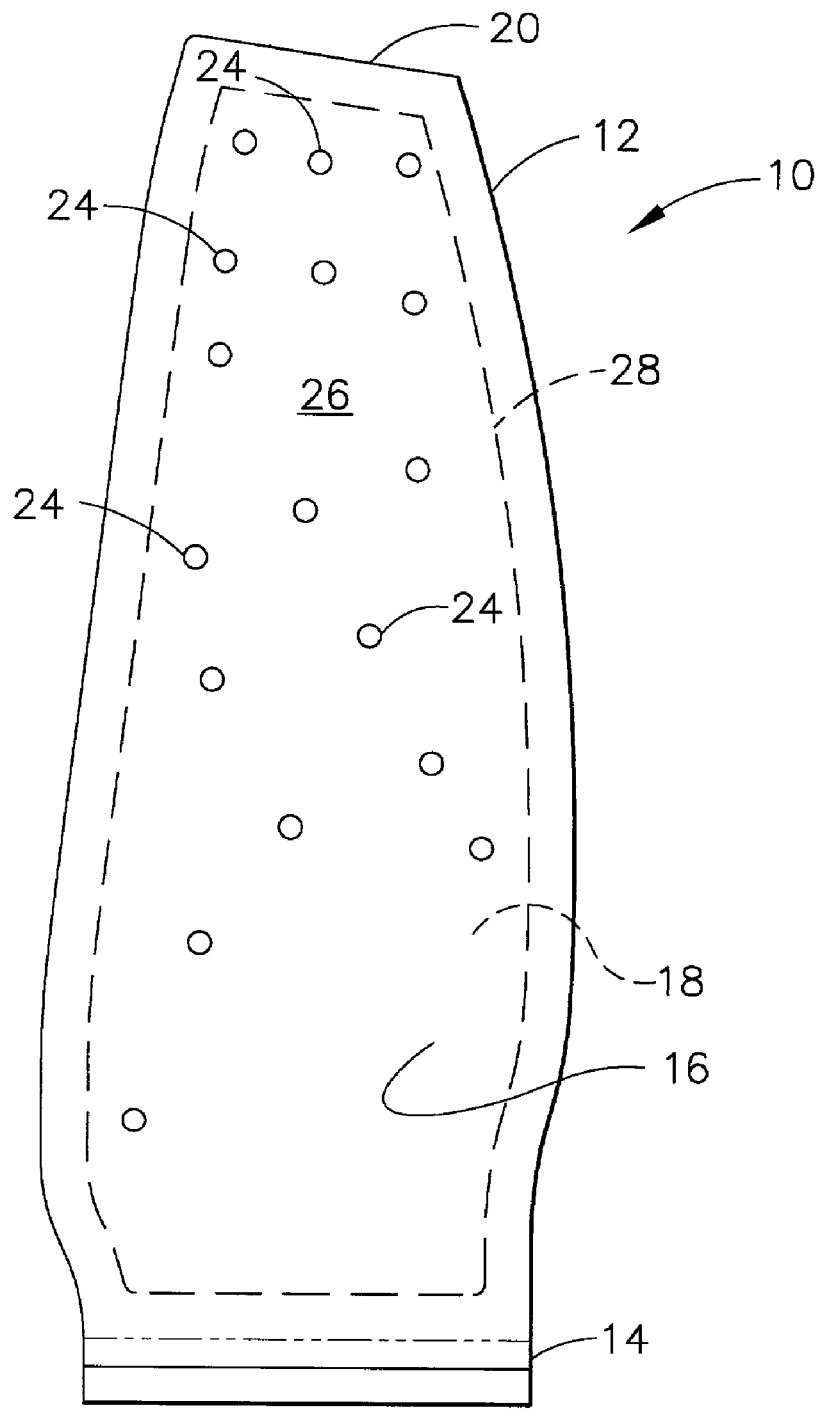
FIG. 1 is a diagrammatic side view of a turbine engine blading member, such as a fan blade, including a fiber reinforced composite airfoil.

In general, disposition of in-plane fiber reinforced, stacked layers within a cured resin matrix has provided some strength and some resistance to material loss in such articles as gas turbine engine blading members. A typical example is an aircraft gas turbine engine fan blade, known in the art to be of complex shape, twist, thickness, etc. Such composite structure is lighter in weight than a comparable metal article. Therefore, use of a reinforced composite article to replace a metal article has contributed to improvement in operation of a gas turbine engine. However, because such a structure includes stacked layers or laminations, an impact on the article, typically on the airfoil of a blading member, can cause the layers to separate or delaminate. An impact on such a laminated article including a matrix of a commonly used resin having relatively low toughness and tensile strain properties has been observed to result in damage including delamination and/or material loss not only to the airfoil but also to the blade base and shank.

Damage from impacts has been observed on an article including such commonly used resin matrix systems, even though the article has included the type of known transverse additional reinforcement, for example as described above in connection with the Mallinder et al. and the Benoit et al. patents. Also, it has been observed that pinning, stapling, or stitching substantially uniformly across an entire blading member airfoil, without regard to variations in strain energy developed in different regions during operation, can result in more damage to or delamination of the airfoil than one without any additional angled or transverse reinforcement. It is believed that such damage in the airfoil, typically a gas turbine engine fan or compressor blade airfoil, using such known pinning can result from different operating stresses or strain energy generated between airfoil regions during operation. Such strain energy amounts, as is well known in the gas turbine engine art, are a function of loading and forces on the airfoil during engine operation. Angled or transverse pinning only in one region of an airfoil or uniformly across the entire airfoil, without regard to variability of strain energy developed, can tend to drive the strain energy toward a region of the airfoil not adequately reinforced to resist such energy. This can result in damage or failure such as delamination in the region into which such excess strain energy has been driven. Therefore, it has been recognized, according to forms of the present invention, that a different, selected density or amount of such additional reinforcement is required in and between selected regions of an airfoil, as a function of the desired or required resistance to strain energy developed during operation.

As used herein, the term "strain energy", as is well known in the gas turbine engine art, means the kinetic or dynamic energy developed in a blade airfoil during operation. The result is an amount of deflection and straining of the airfoil in a particular region of the airfoil. For example, thinner portions of the airfoil, such as at the airfoil tip and the leading and trailing edges, develop less strain energy during operation. According to forms of the present invention, such thinner regions require lower densities of pinning type of reinforcement than do other regions of the airfoil located inwardly of such thinner regions. In an airfoil, there can be a plurality of regions about the airfoil requiring different amounts of such additional reinforcement depending on the strain energy developed in each region during operation. Disposition of such additional reinforcement, for example pinning, according to forms of the present invention, is selected about the airfoil substantially to balance or compensate for the variability of strain energy developed in the airfoil during operation.

In a preferred form of the present invention, a plurality of selected regions together substantially cover the entire airfoil generally between, but not necessarily including, the limits of the leading and trailing edge portions and the tip and base portions. However, the density of pinning varies between adjacent or contiguous regions to balance or resist strain energy developed in a region. For example as has been stated, a region adjacent or in the vicinity of an airfoil tip, a leading edge, or a training edge generally will require a lower density or amount of pinning than a region or regions generally in the middle portion of the airfoil. In a preferred form, pinning within a region is disposed substantially uniformly within that region. Such arrangement, in some embodiments, can eliminate, further, variations in stress energy even within a region. As was mentioned, it is one object of the present invention to disperse strain energy substantially uniformly about an airfoil that includes a plurality of regions that develop different strain energies.

Use of the above-defined toughened, high tensile strain resin as a matrix of a fiber reinforced composite article comprising stacked layers of aligned, in-plane reinforcing fibers, in combination with additional angled, preferably transverse, reinforcing pin bundles, provides an article resistant to cracking, crack propagation, and layer delamination. As it relates to an airfoil of a gas turbine engine blading member, such a laminated construction with the toughened, high tensile strain resin produces a solid structure with proper orthotropic properties which meets centrifugal and gas loading requirements. In addition, the angled, preferably transverse, pin reinforcement disposed within at least one selected region of an article provides improved out-of-plane strength through the thickness of the article, such as the blading member airfoil, necessary to withstand higher impact loads that can be experienced during service operation and to inhibit propagation of delamination resulting from such impacts. Furthermore, forms of the present invention as an airfoil of a blading member of a gas turbine engine include a plurality of selected regions together substantially covering the airfoil, with the density of additional reinforcement being different between regions as a function of the strain energy developed in the airfoil.

The present invention will be more fully understood by reference to the drawings. FIG. 1 is a diagrammatic side view of a typical gas turbine engine composite, laminated, fiber reinforced blading member, in the form of a fan blade, shown generally at 10, for example in a form shown in the prior art. Blade 10 includes an airfoil 12, a base 14, a first side surface 16, a second surface side 18, and an airfoil tip 20. Sometimes first and second side surfaces 16 and 18 are referred to as the pressure and suction sides of an airfoil. Airfoil 12 includes a thickness 22, shown in more detail in FIG. 2, and which can vary across airfoil 12 as a function of its design. Airfoil 12 includes additional reinforcing pins, some of which are shown at 24, disposed within an entire airfoil surface or region 26 included within broken line 28. Region 26 is spaced apart from airfoil portions immediately at the airfoil tip, edges and base portions of the airfoil. However, as will be discussed in connection with similar FIG. 4, which represents, diagrammatically, an airfoil region arrangement according to a form of the present invention, generally airfoil 12 includes a plurality of contiguous regions generally about the airfoil.

Figure 2:
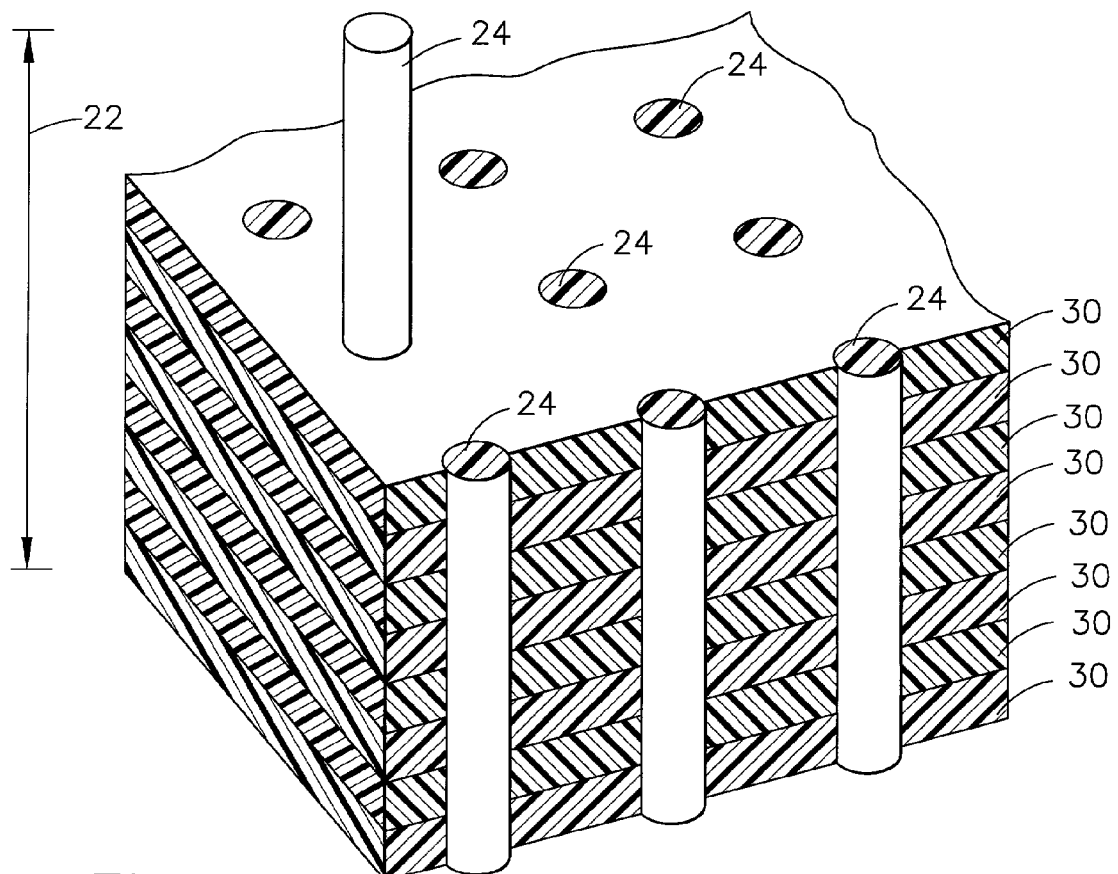
FIG. 2 is an enlarged, diagrammatic, fragmentary, partially sectional view of a portion through a thickness of the airfoil of the composite airfoil of FIG. 1 showing stacked, fiber reinforced layers and reinforcing pins disposed generally transversely to the layers.

In the embodiment of FIG. 1, surface region 26 substantially covers the entire surfaces 16 and 18 of airfoil 12, with reinforcing pins 24 disposed into airfoil 12 generally transversely to airfoil surface region 26. In the form of FIGS. 1 and 2, reinforcing pins 24 extend substantially completely through airfoil 12, from surface 16 to surface 18.

FIG. 2 is an enlarged, diagrammatic, fragmentary, partially sectional view through a portion of thickness 22 of airfoil 12 within region 26. Reinforcing pins 24, one shown as protruding from the fragmentary section, are disposed within and, in this example, substantially transversely to a plurality of typical stacked, fiber reinforced composite planes or layers 30 in airfoil 12.

Figure 3:
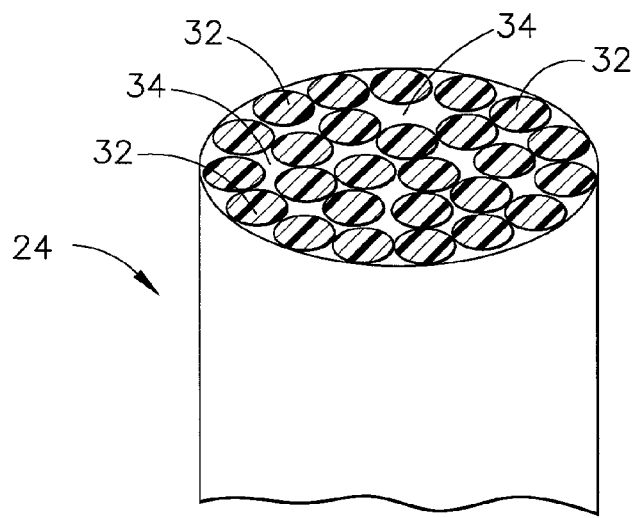
FIG. 3 is an enlarged, diagrammatic, fragmentary, sectional view of a pin comprising a bundle of filaments impregnated with a resin matrix.

FIG. 3 is an enlarged, diagrammatic, fragmentary sectional view of a reinforcing pin shown generally at 24. Pin 24 comprises a bundle or plurality of generally aligned filaments 32, for example made of carbon, graphite, glass, metal, or their mixtures, held in a resin matrix 34 about filaments 32.

Figure 4:
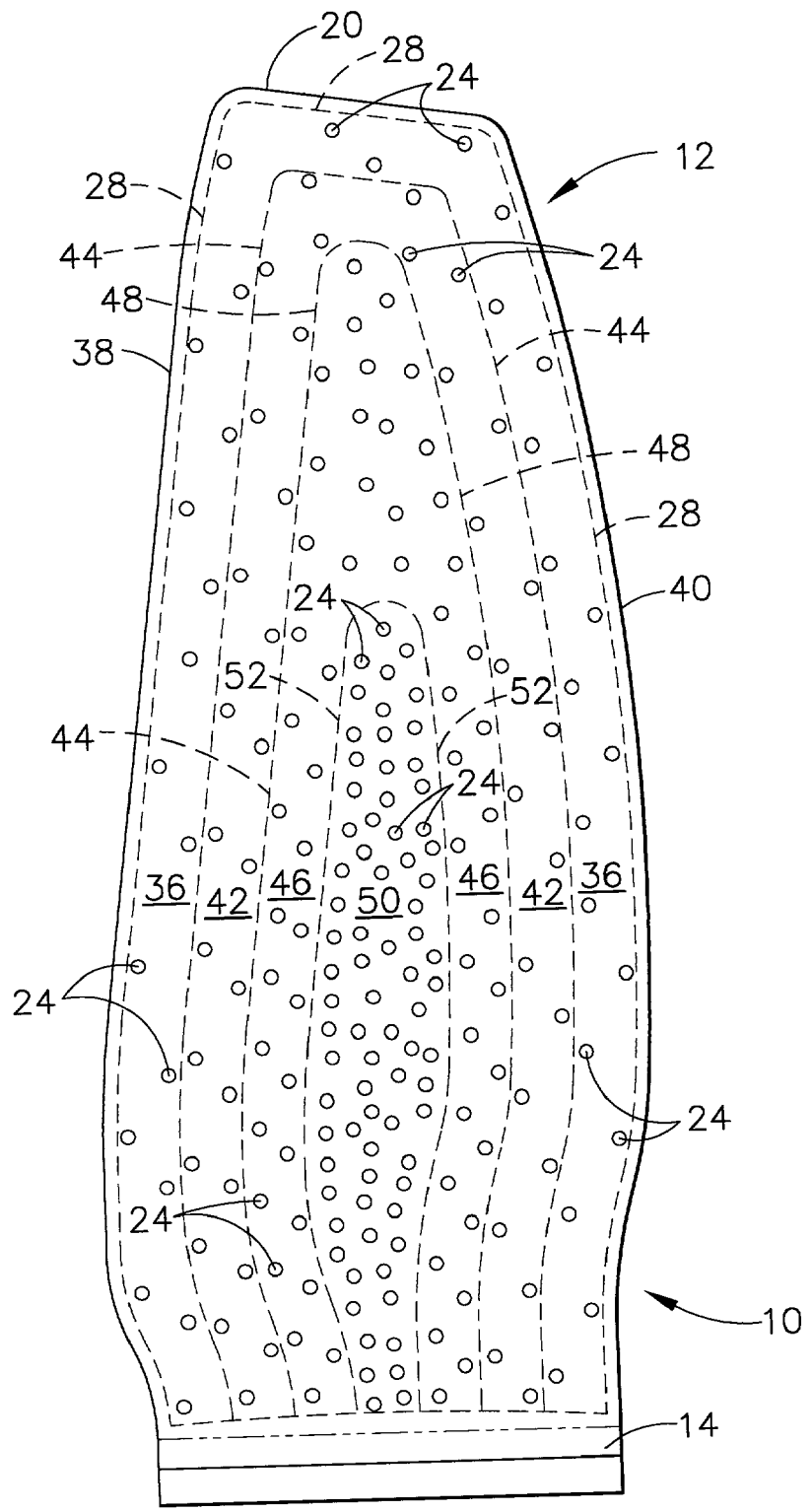
FIG. 4 is a diagrammatic side view of a blading member as in FIG. 1 showing a plurality of selected airfoil regions each including a density of reinforcing pins selected to compensate or as a function of the strain energy developed during operation in a particular region.

FIG. 4 is a diagrammatic side view of a typical gas turbine engine composite, laminated fan blade 10 generally as shown in FIG. 1. However, the embodiment of FIG. 4, as one diagrammatic embodiment of the present invention in respect to gas turbine engine blading members, includes a plurality of selected surface regions of the airfoil. A first region 36 is generally a "U" shaped region extending about airfoil 12 just inwardly from leading edge 38, tip 20, and trailing edge 40. First region 36 is contiguous with a second region 42, also generally of a "U" shape, inwardly of first region 36. Broken line 44 generally represents a boundary area between first region 36 and second region 32. A third region 46, is shown inwardly of second region 42, contiguous with second region 42. Broken line 48 generally represents a boundary area between second region 42 and third region 46. A fourth region 50, in the embodiment of FIG. 4, is disposed inwardly of third region 46, with broken line 52 representing a boundary area between third region 46 and fourth region 50. It should be understood that the regions of a particular airfoil, for example of a gas turbine engine fan or compressor blade airfoil, can vary from the diagrammatic embodiment of FIG. 4, with the different regions disposed about the airfoil as a function of the variation in strain energy developed in a particular design of airfoil during operation.

As shown in embodiment of FIG. 4, the densities of pins 24 within regions 36, 42, 46 and 50 generally are different between contiguous regions as a function of the strain energy developed during operation of the airfoil, substantially to balance the airfoil strain energy generated during operation of the airfoil. In that embodiment, the density of reinforcing pins in each region increases between regions from first region 36 through fourth region 50. This is a diagrammatic example of disposition of such pins to balance, or resist transfer of, airfoil strain energy during operation Density as used herein in respect to the pins in a region means the ratio of the sum of the surface areas of all pins in a region to the total surface area of the region. It should be understood that the cross sectional area of particular pins can be different from one another while substantially maintaining the selected pin density within a region. For example, a larger number of pins each with a relatively smaller cross sectional area can provide improved surface contact with a surrounding matrix.

Within each such region, it is preferred that pins 24 be disposed substantially uniformly within that region further to avoid creation of stress concentrations within that region. As shown in the embodiment of FIG. 4, the density of pins 24 in region 50, generally in a middle portion of airfoil 12, is greater than in either regions 36, 42 and 46, with pins 24 substantially covering each region to avoid stress concentrations within the respective region. As the present invention relates to gas turbine engine airfoils, it is preferred that the density of the pins in a region be in the range of about ½ to about 5%, more specifically in the range of about ½ to about 2%. It has been observed that a pin density of less than about ½% in a region is insufficient to provide required additional reinforcement and resistance to strain energy. In addition, a pin density of greater than about 5% in a region provides excessive resistance to strain energy or stiffness that can lead to what sometimes is referred to in the art as notch sensitivity. More particularly in a gas turbine engine laminated composite fan or compressor blade, a pin density in a region is preferred to be in the range of about ½–2%.

One series of evaluations associated with the present invention was conducted to compare ordinary, commercially available heat curable epoxy resin systems, currently used in the art as matrix resins for laminated composite articles, with the heat curable epoxy forms of the above-defined type of toughened resin, included in forms of the present invention. Such a comparison was made with the matrix resin cured in stacked layers of aligned reinforcing fibers. Currently used cured resin systems, one example of which commercially is available as Dow Chemical TACTIX 123 epoxy resin system, have a tensile strain property of about 5% or less, for example in the range of about 2–5%, in combination with a $K_{1c}$ toughness of less than about 850 psi·inch$^{1/2}$, for example in the range of about 400–500 psi·inch$^{1/2}$. These properties both are typical of currently used epoxy resin systems.

It was recognized that use of such current resin systems in certain applications, alone and without additional angled or transverse reinforcement, resulted in insufficient resistance to impact damage and delamination caused by ingestion of such objects as birds, hail, and land ice into the engine. For example, one type of test impacted the cured laminated structure with an object equivalent to a 2.5 pound bird. The lower tensile strain of current systems was insufficient to resist impact damage or loss of material, and the lower toughness level provided too low a threshold at which cracking and layer delamination could be initiated. This lower threshold results in unacceptable component matrix loss causing performance and balance conditions detrimental to the engine. In contrast according to a form associated with the present invention, a matrix, for stacked reinforcing layers, of a cured epoxy resin system with a tensile strain property of greater than 5%, for example about 7% or more, in combination with a toughness $K_{1c}$ of at least about 850 psi·inch$^{1/2}$, provided resistance to degradation, such as material damage and delamination, from such an impact.

In one specific evaluation series of a form of the present invention, a plurality of shaped layers of substantially aligned, unidirectional, in-plane carbon fiber bundles, commercially available as IM-7 12K tow tape from Hexel Company, were pre-impregnated, as is commonly practiced in the art, with the above-defined toughened resin to provide layers 30. In this example, the above-defined high strain, toughened epoxy resin was one identified as 3M PR520 epoxy resin system. Properties of that resin system included a tensile strain of about 6.9% and a toughness $K_{1c}$ of about 1380 psi·inch$^{1/2}$.

Such prepreg layers were disposed in a stack of layers in a supporting fixture, with typical amounts of intermediate wicking felt as used in the art. While in the fixture, a plurality of reinforcing pins 24 were inserted into the stack of layers, appropriately in selected densities uniformly within selected regions, substantially transversely to the planes of the layers and generally completely through the stack of layers, to provide a preform. Each pin comprised a plurality or bundle of carbon filaments 32 held in a matrix 34 of a resin compatible with the resin matrix of the prepreg layers, in this example an epoxy resin in the fully cured condition. The preform was compacted or debulked, as commonly is practiced in the art, and disposed in the cavity of a curing mold.

After closing the cavity of the mold, a vacuum was provided in the cavity to remove ambient air from the cavity and from about the preform. The mold and its contents were heated in the range of about 350–400° F. for about 90–120 minutes to cure, concurrently, the resin into a matrix about the fibers and the resin into a matrix about the bundle of filaments in the reinforcing pins 24. This provided an in-plane fiber and transverse pin reinforced carbon/epoxy composite blade. After curing, the mold and its contents were cooled. When removed from the mold cavity, the resulting article was a near net shape molded epoxy resin carbon fiber reinforced composite blade including a molded airfoil and molded base. The cured fiber reinforced composite blade using the above-defined high tensile strain, toughened epoxy resin as a matrix for the stacked layers along with the transverse pin reinforcement provided improved impact capability at the point of impact as well as away from the impact site while retaining blade spanwise and chordwise directional strength capability.

The result of several bird impact tests of the above-described construction form of the present invention showed a decrease of about 54% in the amount of delamination compared with a similar blade without pinning according to the present invention. Any delamination of the above-described blade form of the present invention was confined to the airfoil, whereas delamination of the unpinned blade airfoil delaminated not only in the airfoil but also in the shank and base portions.

Other series of comparison testing were conducted. In one series, a preferred form of the article of the present invention as gas turbine engine blades, constructed with reinforcement pins protruding substantially completely through the thickness and covering substantially the entire surface of the blade airfoil, was compared with similarly constructed articles with no transverse reinforcement. The results showed that practice of the present invention greatly improved the impact performance over articles without such transverse reinforcement. The absence of such transverse reinforcement was not effective in reducing delamination and hastened the progression of delamination and material loss.

Embodiments of the present invention, including a method for making, provide a tough, impact and delamination resistant resin matrix composite article including a combination of in-plane fiber reinforcement and additional reinforcement disposed into the article at an angle to the in-plane fibers. One example of such an article is a blading member of a gas turbine engine. Resin properties are tailored to provide high impact resistance while maintaining, for example in an airfoil, spanwise properties to resist centrifugal and bending loads as well as chordwise properties to resist gas and torsional bending loads. This combination of enhanced properties and multiply types of reinforcement improves the overall operating capability of the article.

The present invention has been described in connection with specific examples and combinations of materials and structures. However, it should be understood that they are intended to be typical of rather than in any way limiting on the scope of the invention. Those skilled in the various arts involved, for example technology relating to gas turbine engines, to fiber reinforced composite structures, fibers and resins, etc, will understand that the invention is capable of variations and modifications without departing from the scope of the appended claims.

What is claimed is:

1. A pin reinforced composite article comprising a plurality of stacked layers of in-plane reinforcing fibers, the layers bonded together with a matrix resin and defining a thickness of the article, and a plurality of spaced apart reinforcing pins are in the article in at least one selected article region at an angle to the stacked layers, wherein:
   a plurality of selected regions are about the article;
   the reinforcing pins are within each selected region at a density that resists strain energy generated during operation of the region; and,
   the density of pins in at least one selected region differs from the density of pins in another selected region, the pins balancing differences in the article strain energy generated in each selected region during operation of the article.

2. The article of claim 1 in which the pins are substantially uniformly within the selected region.

3. The article of claim 1 in which:
   the in-plane reinforcing fibers in a stacked layer are substantially aligned with one another; and,
   the reinforcing pins extend substantially completely through the thickness of the article.

4. The article of claim 1 in which the matrix resin includes properties comprising a tensile strain property of greater than 5% and a $K_{1c}$ toughness of at least 850psi·inch$^{1/2}$.

5. The article of claim 4 in which the pins are substantially uniformly within the selected region.

6. The article of claim 4 in which:
   the in-plane reinforcing fibers in a stacked layer are substantially aligned with one another; and,
   the reinforcing pins extend substantially completely through the thickness of the article.

7. The article of claim 4 in which:
   the in-plane reinforcing fibers in a stacked layer are substantially aligned with one another;
   the reinforcing pins extend substantially completely through the thickness of the article; and,
   the reinforcing pins are in the article transversely to the stacked layers.

8. The article of claim 7 in the form of a turbine engine blading member including an airfoil in which at least the airfoil comprises a plurality of shaped, stacked layers of in-plane reinforcing fibers impregnated and bonded together with the matrix resin, and a plurality of spaced apart reinforcing pins are in the stacked layers of the airfoil in which a plurality of selected regions are about the airfoil.

9. The article of claim 4 in which reinforcing pins comprise a bundle of a plurality of filaments impregnated with a resin.

10. The article of claim 9 in which the in-plane fibers and the filaments of the reinforcing pins comprise at least one material selected from the group consisting of carbon, graphite, glass, and metal.

11. The article of claim 4 in the form of a turbine engine blading member including an airfoil in which at least the airfoil comprises a plurality of shaped, stacked layers of in-plane reinforcing fibers impregnated and bonded together with the matrix resin, and a plurality of spaced apart reinforcing pins are in the stacked layers of the airfoil.

12. The article of claim 11 in which the pins are substantially uniformly within the selected region.

13. The article of claim 8 in which the plurality of selected regions together substantially covers the entire airfoil.

14. The article of claim 11 in which the density of pins in a selected region is in the range of about ½–5%.

15. The article of claim 14 in which the density of pins is in the range of about ½–2%.

16. The blading member of claim 8 in which:
the in-plane reinforcing fibers in a stacked layer are substantially aligned with one another;
the reinforcing pins extend generally substantially completely through the thickness of the article; and,
the reinforcing pins are in the article generally transversely to the stacked layers and comprise a bundle of a plurality of filaments impregnated with a resin.

17. The article of claim 16 in which the in-plane fibers comprise at least one material selected form the group consisting of carbon, graphite, glass, and metal.

18. A pin reinforced composite article in the form of a turbine engine blading member including an airfoil in which at least the airfoil comprises a plurality of shaped, stacked layers of in-plane reinforcing fibers impregnated and bonded together with the matrix resin and a plurality of the spaced apart reinforcing pins are in the stacked layers of the airfoil in at least one selected article region at an angle to the stacked layers, wherein:

the matrix resin includes properties comprising a tensile strain property of greater than 5% and a $K_{1c}$ toughness of at least 850 psi·inch$^{1/2}$, a plurality of selected regions are about the article;

the reinforcing pins are within each selected region at a density that resists strain energy generated during operation of the region; and, the density of pins in at least one selected region differs from the density of pins in another selected region, the pins balancing differences in the article strain energy generated in each selected region during operation of the article.

19. The article of claim 18 in which the plurality of selected regions together substantially covers the entire airfoil.

20. The article of claim 18 in which the density of pins in a selected region is in the range of about ½–5%.

21. The article of claim 20 in which the density is in the range of about ½–2%.

* * * * *